May 12, 1936. H. RUSCH 2,040,535
DIRIGIBLE PASSENGER STATION
Filed Aug. 19, 1935 6 Sheets-Sheet 1
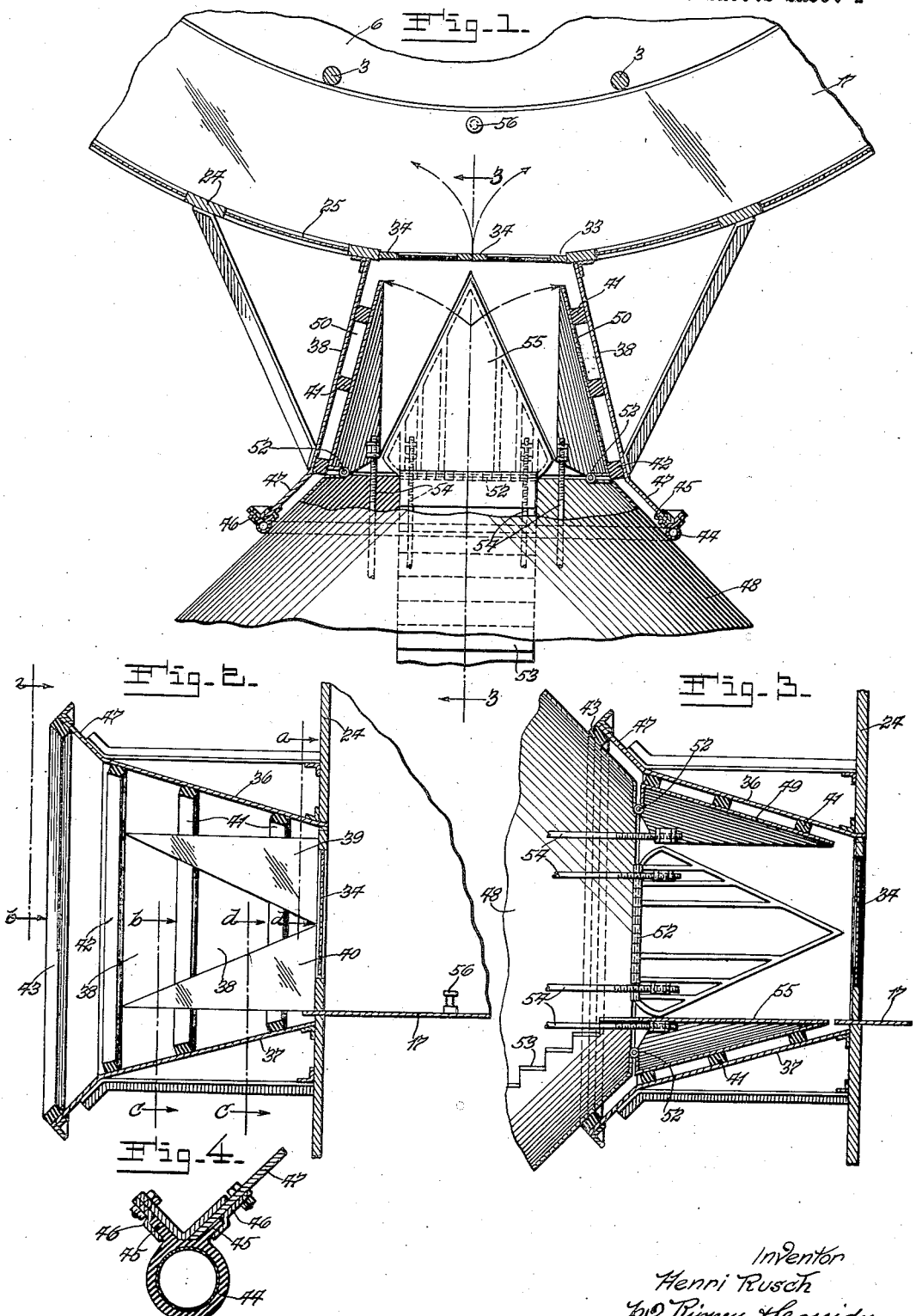
Inventor
Henri Rusch
Rippey & Cassidy
His Attorneys

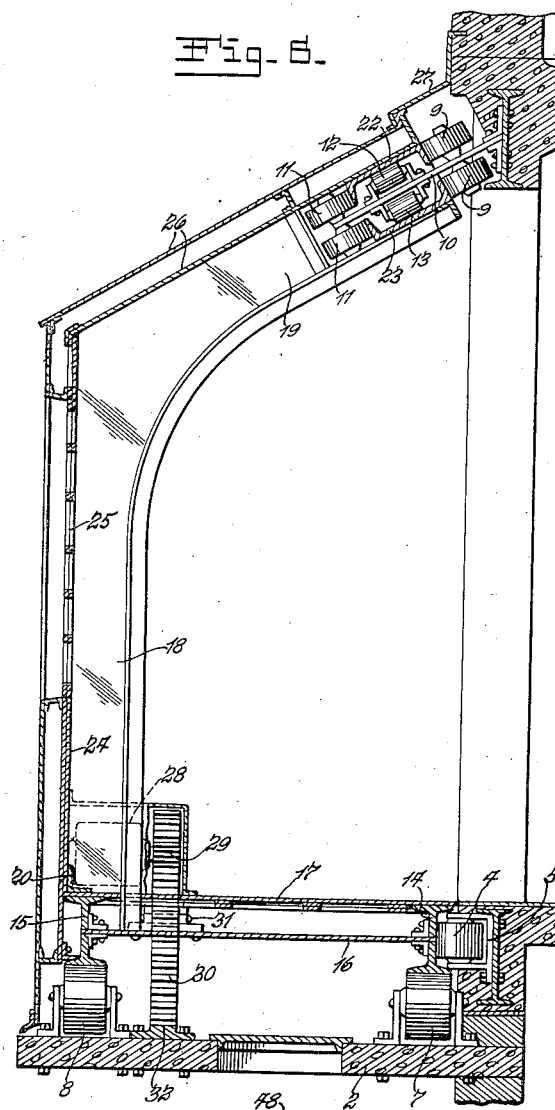

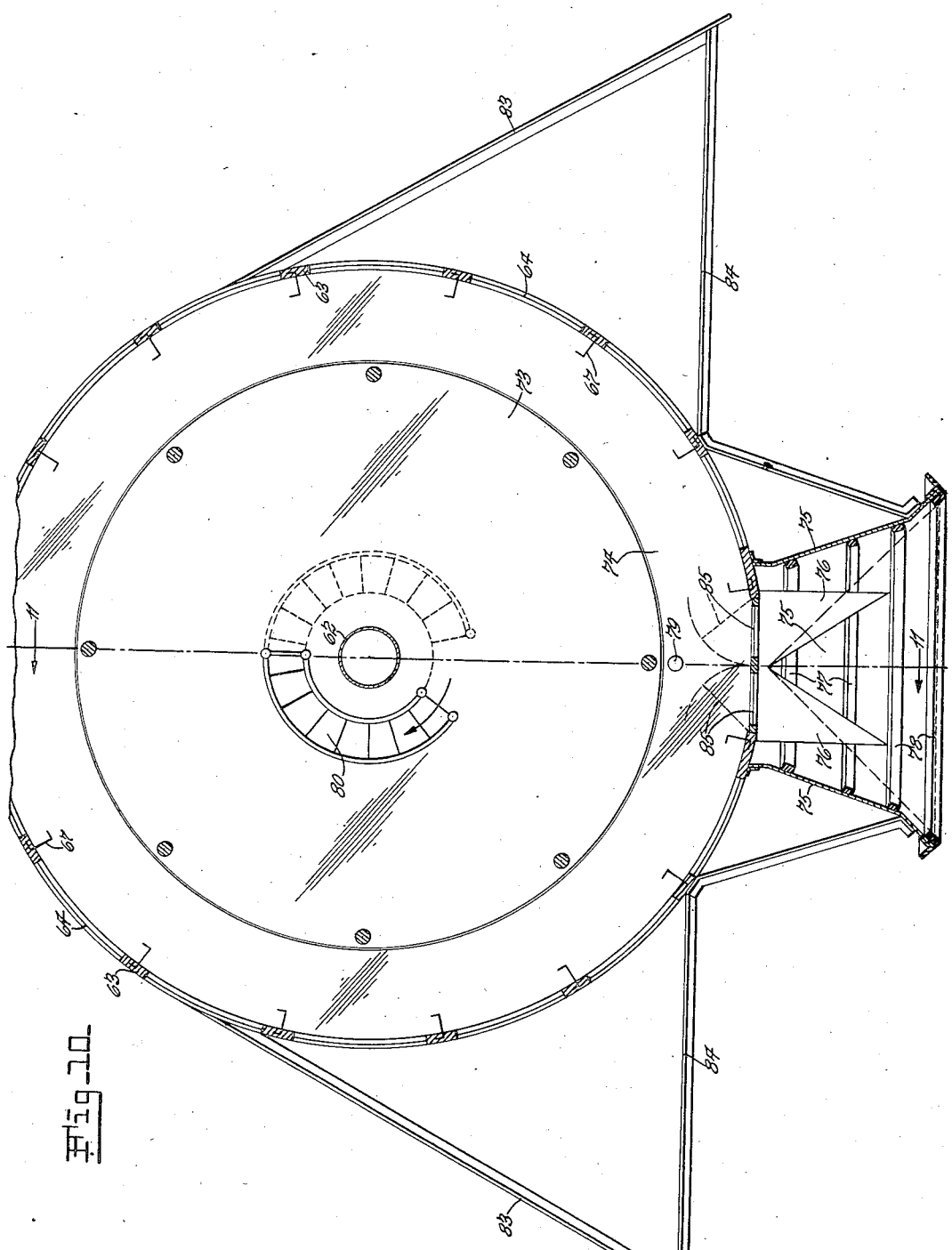

May 12, 1936.  H. RUSCH  2,040,535
DIRIGIBLE PASSENGER STATION
Filed Aug. 19, 1935   6 Sheets-Sheet 4
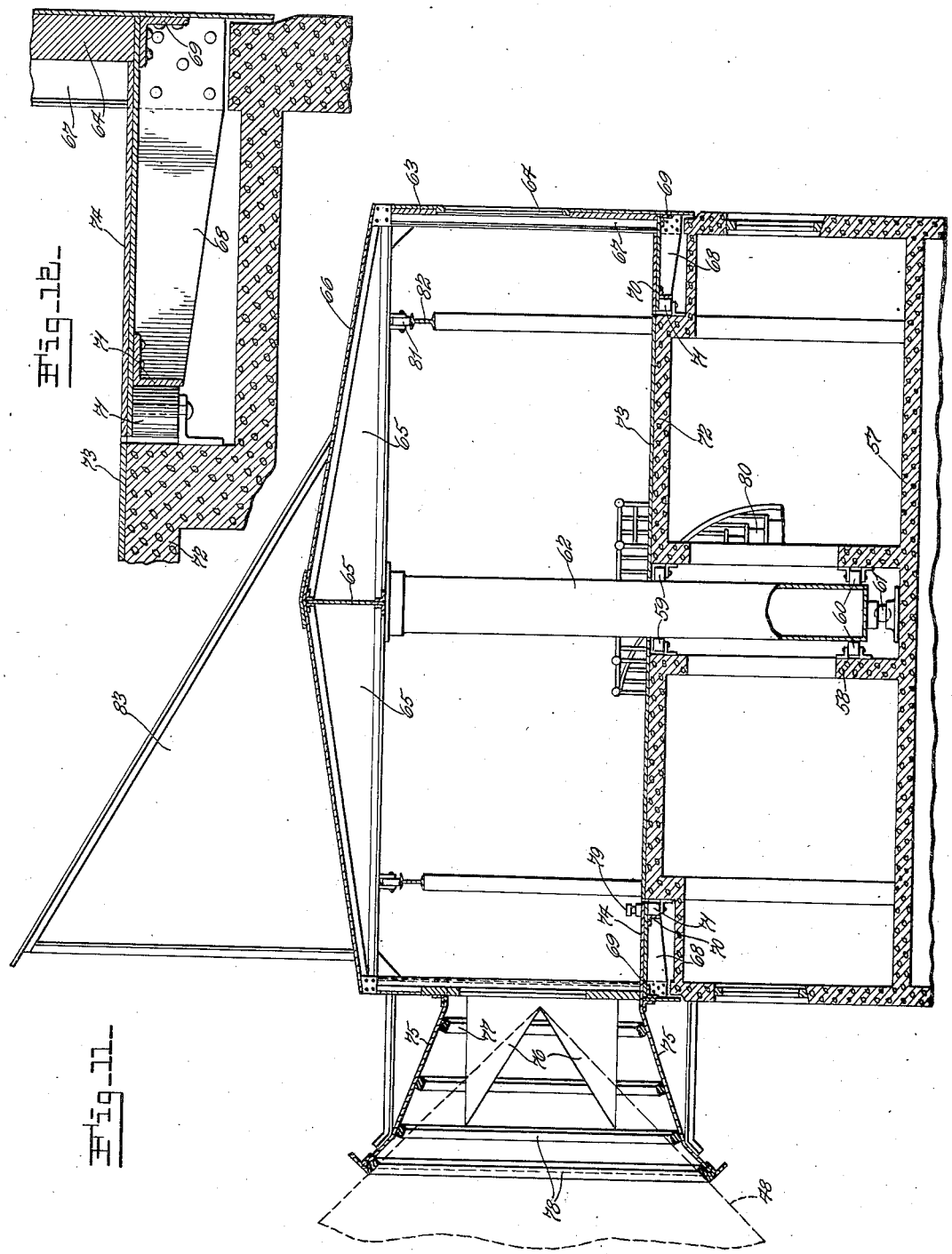
Inventor
Henri Rusch
by Pipsey & Cassidy
His Attorneys

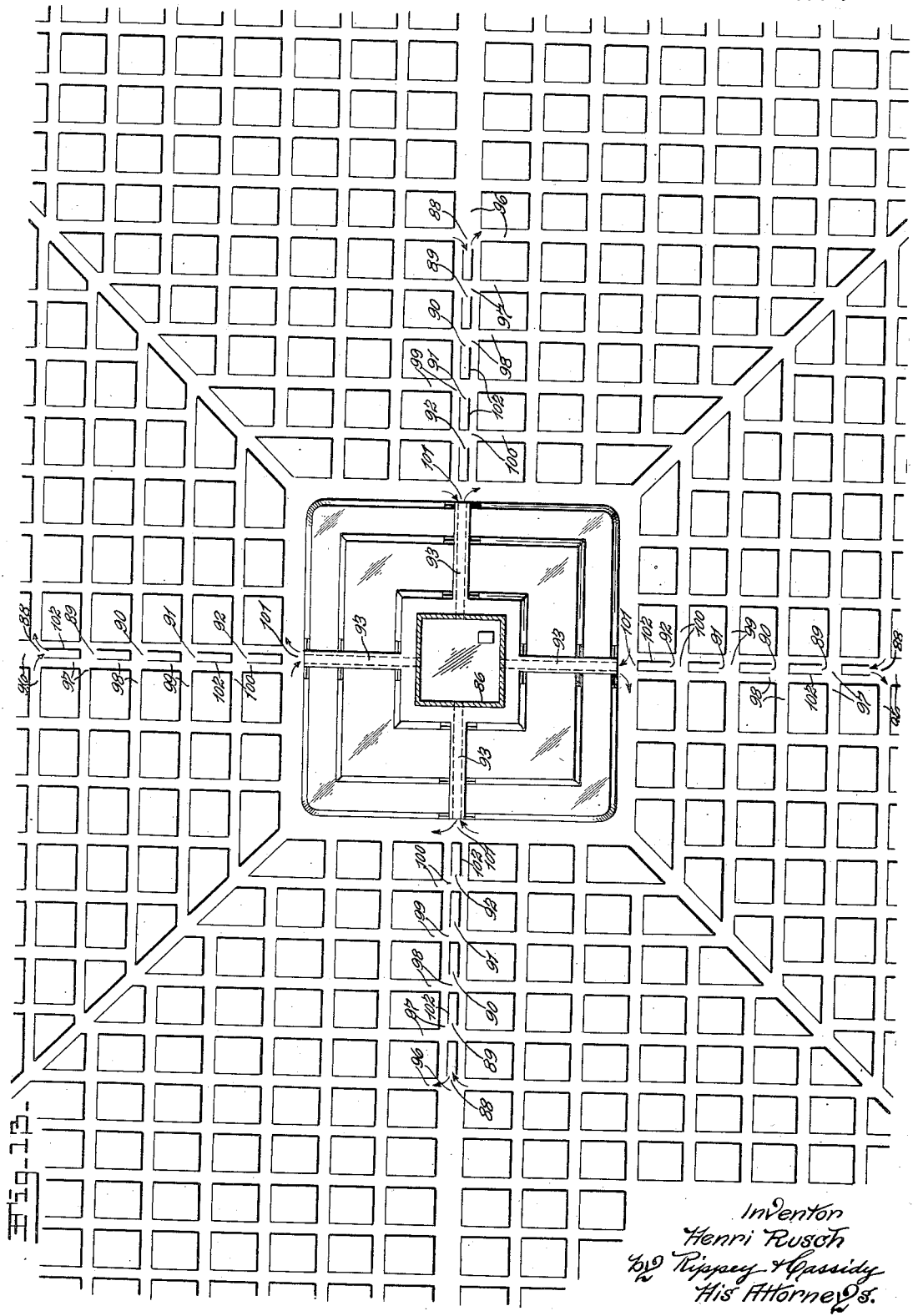

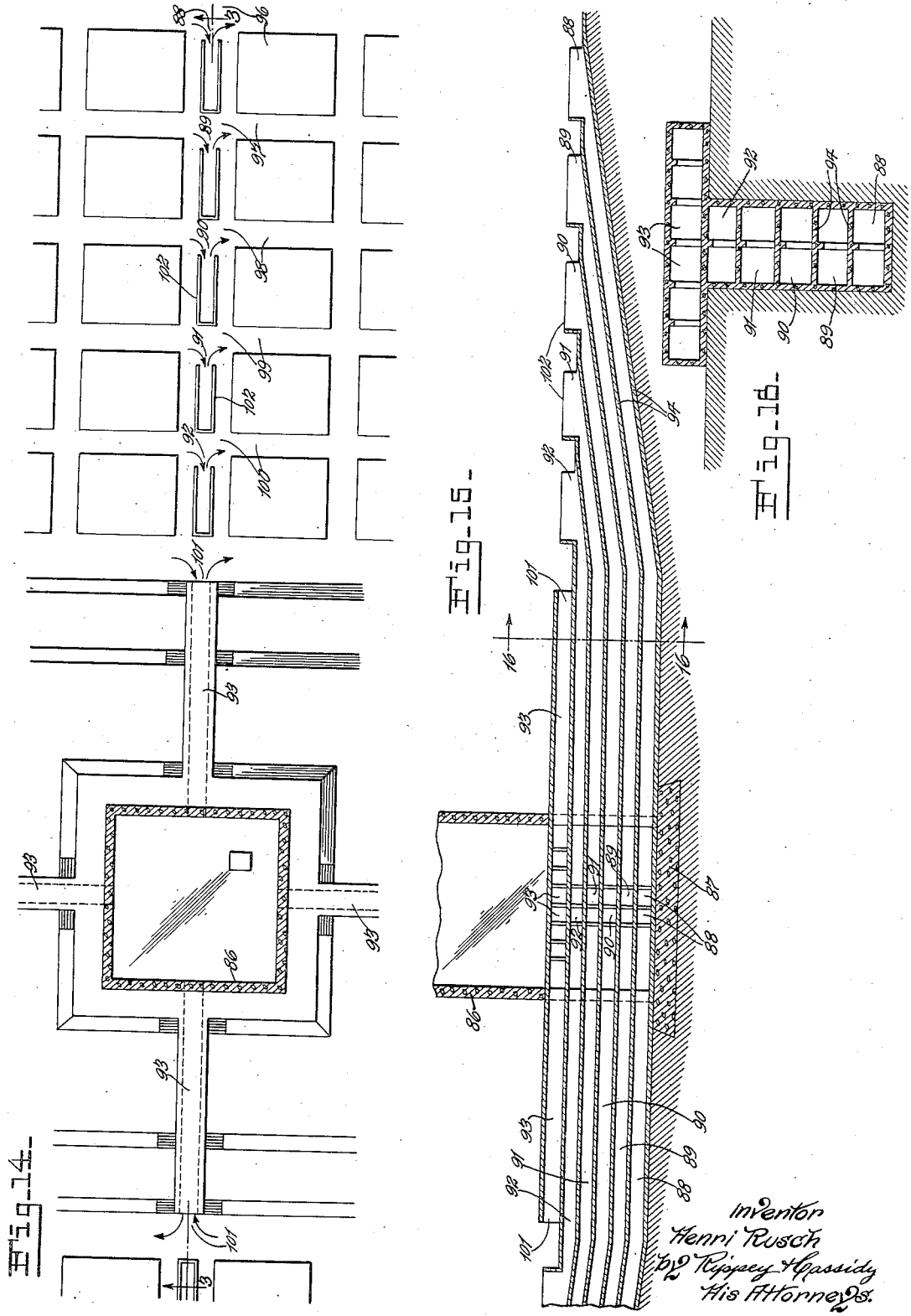

Patented May 12, 1936

2,040,535

UNITED STATES PATENT OFFICE 2,040,535

DIRIGIBLE PASSENGER STATION

Henri Rusch, St. Louis, Mo.

Application August 19, 1935, Serial No. 36,835

6 Claims. (Cl. 244—2)

This invention relates to a dirigible passenger station.

Objects of the invention are to provide an improved station for use by dirigible airships of the lighter-than-air type whereby an airship may be securely anchored to the station; to provide a rotary anchoring structure for the dirigible airship that will rotate freely about a vertical axis so as to permit the airship to extend from the wind and thus prevent the application of wind pressure and strains against the lateral sides of the airship transversely of the longitudinal axis thereof; to provide an enclosure for receiving the forward end of the airship to prevent any substantial lateral or vertical movement thereof with respect to the station; to provide means for forming an exit or entrance for passengers entering or leaving the airship; to provide mechanism for rotating and controlling the structure to which the airship is anchored and through which passengers leave and enter the airship; to provide improved structure for facilitating and expediting the movement of vehicles carrying passengers into and from the building, including the passenger station; and to provide yielding cushioning devices preventing percussive impact of the airship against the anchoring structure.

Other objects and advantages will be readily apparent from the following description, reference being made to the annexed drawings, in which—

Fig. 1 is a horizontal sectional view of a portion of the rotary structure of the passenger station showing the forepart of an airship in anchoring position.

Fig. 2 is a vertical sectional view of that portion of the passenger station including the enclosure for receiving and enclosing the forepart of the airship anchored in connection therewith.

Fig. 3 is a similar vertical sectional view on the line 3—3 of Fig. 1 showing the airship anchored in connection with the station.

Fig. 4 is an enlarged sectional view showing one of the elastic cushioning devices for preventing percussive contact of the airship and the station.

Fig. 5 is a detail sectional view showing the mechanism whereby the rotary portion of the station is rotated about its vertical axis to place the airship properly with respect to the wind or air currents.

Fig. 6 is an enlarged vertical sectional view of the rotary portion of the station approximately on the line 6—6 of Fig. 5.

Fig. 7 is a side elevation showing, in solid lines, the forepart of the airship and, in broken lines, positions to which the hinged parts of the forepart of the airship are moved when the airship is anchored in connection with the station.

Fig. 8 is a front end elevation of the structure shown in Fig. 7.

Fig. 9 is a combined end and sectional view of that part of the station that receives and encloses the forward end of the airship, the quadrant a—b being on the line a—b of Fig. 2; the sectional quadrant b—c being on the line b—c of Fig. 2; the quadrant c—d being on the line c—d of Fig. 2; and the quadrant d—a being on the line d—a of Fig. 2.

Fig. 10 is a horizontal sectional view of an alternative form of the device that is rotated by the air currents or wind without the use of mechanical propelling devices.

Fig. 11 is a vertical sectional view on the line 11—11 of Fig. 10.

Fig. 12 is an enlarged view of a part of the devices for properly supporting the rotary part of the station to which the airship is anchored.

Fig. 13 is a plan view of a part of the station and the approaches thereto, the upper portion of the station being shown in section.

Fig. 14 is an enlarged detail view of a portion of the approaches and exits connected with the station.

Fig. 15 is a vertical sectional view on the line 15—15 of Fig. 2.

Fig. 16 is a vertical sectional view on the line 16—16 of Fig. 3.

My invention is shown embodied in or mounted on a rigid building structure 1. The building 1 is preferably of relatively considerable height in order to facilitate the anchoring or attachment of the dirigible lighter-than-air ship in connection therewith and the movement of the ship to the leeward about the vertical axis of the part to which it is moored or anchored, so that there will be substantially no lateral wind forces against the longitudinal sides of the airship. The mooring with the airship at a considerable height also provides space for the construction of stationary floors and movable floors over and along which the passengers and others may walk to board and leave the airship. The mooring device includes a housing portion for receiving the nose or extreme front end portion of the airship, which may be manipulated and adjusted to provide a space and a walk through and along which persons may pass in boarding and leaving the airship. The building structure 1 includes an outwardly extended surrounding rigid floor or platform 2 and an upwardly extended superstructure 3.

An annular series of rollers 4 are rotatively supported in an annular channel bar 5 rigid in the building structure 1 below the floor 6, and two annular series of rollers 7 and 8 are supported by the floor 2. Inner annular series of cooperating rollers 9 are rotatively supported by a rigid frame member 10 attached to the super-structure 3, which also supports similar outer annular series of rollers 11 and intermediate annular series of rollers 12 and 13.

The rotary mooring device for a dirigible airship of the lighter-than-air type operates upon or against the rollers described. The lower portion of the rotary mooring device includes an annular bar 14 operating around and against the annular series of rollers 5 and upon the annular series of rollers 7, an annular bar 15 operating upon the annular series of rollers 8, a plate 16 rigidly connecting the bars 14 and 15, a floor member 17 comprising an annular plate attached to the bars 14 and 15 in horizontal alinement with the floor 6. Frame members comprising vertical portions 18 and portions 19 extending inwardly and upwardly from the upper end thereof are rigidly attached to the frame member 15 by angular annular bars 20 and 21. The upper ends of the inwardly extended portions 19 of the frame elements support annular channel bars 22 and 23, the edges of which operate against the rollers 9 and 11, respectively, and the inner surfaces of which operate against the rollers 12 and 13. Wall construction 24, including windows 25, is attached to the vertical frame parts 18, and roofing plates 26 are attached to the wall construction 24 and to the channel bar 22, and the inner edges of the roofing structure are overlapped by a flashing plate 27 attached to the super-structure 3 of the building.

An electric motor 28 is supported by the floor plate 17 and drives a pinion 29 meshing permanently with a gear wheel 30 supported for rotation about a horizontal axle 31. The axle 31 is mounted on the connecting frame plate 16. The gear wheel 30 meshes with an annular rack 32 attached to the rigid floor or platform 2 so that, when the motor 28 is operating, the mooring frame and enclosure will be rotated about a vertical axis, the frame elements of said combined frame and enclosure operating against the various rollers and series of rollers already described, so that there is only slight resistance to the rotation of the mooring device.

One side of the wall 24 is formed with a combined entrance and exit opening 33 provided with oppositely swinging doors 34. An enclosure is formed around the opening 33 by an outwardly flaring wall having its inner end attached to the wall 24 and comprising four curved portions including a top curved portion 36, a bottom curved portion 37, two side curved portions 38 and flat wall portions 39 at each side connected with flat wall portions 40 at the top and bottom, respectively. The flat wall portions 39 at the sides connect the curved side wall portions 38, and the flat wall portions 40 at the top and bottom connect the flat side wall portions 39 with the top curved portion 36 and with the bottom curved portion 37, respectively. Elastic members 41 are attached to the curved portions 36, 37 and 38 between the flat wall portions, and annular elastic cushions 42 and 43 are attached to the inside of the outer annular wall structure beyond the ends of the flat portions 39 and 40. As shown in Figs. 2 and 3, the cushions 41 and 42 are solid bodies of elastic material, such as rubber; but, if preferred, a pneumatic elastic cushion 44 may be substituted for the cushion 43 and held in place by flanges 45 on said cushion 44 engaging clamping members 46 attached to the outer portion 47 of the wall structure.

The enclosure thus formed is designed and adapted to receive the front end or nose of an airship of the lighter-than-air type, and is specially designed and adapted to receive the construction shown in Figs. 1 and 3. The front end or nose of the airship 48 comprises four transversely curved conical plates, including a top plate 49, two side plates 50 and a bottom plate 51 connected with the body of the airship 48 by hinge devices 52. These curved triangular plates may be moved to position in which they form a pointed end or nose for the airship, or may be swung apart to provide an opening through which passengers may pass to board or to leave the airship. A stairway 53 in the body of the airship 48 leads from the passenger compartment to the opening provided by the hinged triangular doors or members 49, 50 and 51. The body of the airship extends into the opening provided by the wall structure already described, and engages against the elastic cushion 43 or its analog 44. Rotary operating connections 54 extend from the control room of the airship to connection with the respective curved and pointed doors or members 49, 50 and 51, so that said doors or members may be simultaneously operated by an appropriate operating device (not shown) for rotating the rods 54.

The bottom door member 51 supports a flat wall or floor element 55 which, when the airship is moored, is in horizontal alinement with the floor 17 of the mooring device. The rotary mooring device carries a rigid capstan 56 to which a mooring cable connected with the airship may be attached.

By a proper operation and control of the motor 28, the mooring compartment for the nose of the airship may be turned to extend to the leeward, thus extending the longitudinal axis of the airship to the leeward and preventing the application of undue strains by the wind or air cushions against the sides of the airship.

The construction of the mooring device may be varied widely, and a suggested variation is shown in Figs. 10, 11 and 12. As there shown, the rigid super-structure 57 of the dirigible station is formed with an upright central column 58 in the upper portion of which an annular series of rollers 59 are mounted, a similar annular series of rollers 60 being mounted in the lower portion thereof, and an anti-friction supporting bearing 61 in the bottom thereof. A mast 62 is journalled for rotation about a vertical axis in bearings formed by the anti-friction rollers 59 and 60 and is supported at its lower end on the anti-friction bearing 61. A mooring turret in this construction, as in the construction already described, is a housing or enclosure, and comprises an annular enclosing wall 63 provided with numerous windows 64. The enclosing wall 63 is attached to a relatively rigid frame including radial bars 65 at the top of the turret supporting a conical roof 66. The rigid frame further comprises vertical frame members 67 attached to the outer ends of the bars 65 and to the wall 63. Bars 68 are attached to the lower ends of the vertical bars 67 and to an annular angle bar 69, which is also attached to the lower ends of the vertical bars 67. The bars 68 extend inwardly and have their inner ends connected with and supporting an annular bar 70 operating against an annular series of rollers 71 supported by the rigid floor 72 of the building super-structure. The surfacing 73 of the floor 72 is in horizontal alinement with an annular floor member 74 attached to the bars 68.

An outwardly flaring mooring enclosure for the nose of the airship is formed by a wall including curved portions 75 and flat portions 76 arranged like the curved and flat portions forming the enclosure for the nose of the moored airship, already described. Elastic cushioning elements 77 are attached to the curved portions 75 of the enclosure for the nose of the moored airship, and elastic cushions 78 are attached to the circular portions of the wall forming said enclosure outwardly beyond the ends of the flat portions 76. A capstan 79 is attached to the rotary mooring turret for engagement by a rope or cable to hold the airship moored in connection with the mooring turret. It should be understood that the nose of the airship for which this mooring turret is specially provided is constructed like the nose of the airship already described, although my improved mooring turrets are not limited in that particular. It is intended that passengers shall board and leave the airship anchored to this mooring turret in a manner similar to that in which the passengers board and leave the airship anchored to the mooring turret already described.

A winding stairway 80 may be attached to and around the rigid part 60 of the building super-structure in connection with which my improved mooring turret is located.

As already explained, this invention is designed and adapted specially as a mooring turret for dirigible air-ships of the lighter-than-air type and on buildings of great height. The mooring turret for aircraft of the lighter-than-air type illustrated in Figs. 1 to 6, inclusive, may be mechanically rotated, as by a motor and gearing, as shown and described, or manually rotated by the application of power to the mast 62 or any other part of the rotary turret, including the capstan 79. Or, the rotary turret may be equipped with devices whereby the wind or air currents will turn the turret so that the mooring side is extended to the leeward. In all such rotation, the turret is held from tilting by an annular series of rollers 81 connected with the frame structure 65 and operating on an annular rail 82 that is concentric with the axis of the mast 62. The wall structure 64 supports diverging relatively wide walls 83 sustained in a rigid relationship with respect to the turret and with respect to each other by frames 84. These walls 83 diverge from each other toward that side of the turret which is provided with a mooring device, already described. These walls 83 diverge from connection with the wall 63 in the manner shown in Fig. 10, so that the wind and air currents flowing and pressing against the outer surfaces of said walls will turn the turret about the vertical axis of the mast 62 to extend the mooring side of the turret to the leeward. As shown, the passengers boarding and leaving the airship pass through an opening in the wall 63 controlled by oppositely swinging doors 85.

As already indicated, this mooring device for aircraft of the lighter-than-air type is specially designed and adapted for use on very high buildings, although the utility of the device is not restricted to such location. Assuming that the mooring turret is mounted on a building of great height, it is essential that means be provided to expedite entering and leaving the building. As diagrammatically shown in Figs. 13 to 16, inclusive, the base of the building occupies a great amount of space, and it is assumed that the building will accommodate many thousands of people at the same time. The foundation of the building extends far into the ground, the walls 86 of the building being conventionally illustrated. The foundation or subterranean portion 87 of the building extends into the ground far enough to provide space for a considerable number of superposed passages or tunnels 88, 89, 90, 91, 92, 93, etc., which have ramps 94 at their outer ends (Fig. 15) provided with inlet and outlet openings 95 at the respective streets or avenues 96, 97, 98, 99, 100, 101, etc. These tunnels open into and from the building at the four sides thereof, so that automobiles and other vehicles may speedily enter and leave the building from and toward any required direction. It will be understood that the building is equipped with appropriate elevators (not shown) for the conveyance of passengers and merchandise from the basement entrances to the mooring turret, and vice versa. Around the entrance or opening to each of the tunnels, the protecting wall 102 is provided as a measure of safety.

From the foregoing it should be apparent that the special purposes for which my improved mooring turret is designed are attained by the construction shown and by many obvious variations thereof. Further, the mooring turret is properly controlled so that the airship extends to the leeward from the turret and is protected from the forces of lateral winds and air pressures. Also, when the mooring turret is mounted on buildings of great height, the movement of the passengers and merchandise in entering and leaving the building is accelerated by the provision of the numerous tunnels through which vehicles may enter and leave the building in transporting passengers and merchandise to and from the building.

The invention may be varied in numerous particulars without departure from the nature and principle thereof.

I claim:—

1. In a mooring station for dirigible airships of the lighter-than-air type, a rigid building super-structure having a rigid floor, a rigid platform extending outwardly from and spaced below said floor, a mooring turret rotatively supported by said platform, an annular floor member supported by said turret and surrounding said rigid floor, an enclosing wall supported by said turret and cooperating with said floor and said floor member to form a room, a rigid roof for said room, means for holding the nose of an airship of the lighter-than-air type in fixed relation to said turret, and means forming a passageway from said turret to said airship for the movement of passengers leaving the turret to board the airship, and vice versa.

2. In a mooring station for dirigible airships of the lighter-than-air type, a rigid building super-structure having a rigid floor, a rigid platform extending outwardly from and spaced below said floor, a room enclosing wall rotatively supported by said platform, an annular floor member supported by said wall around said floor and cooperating with said wall and said floor to form a room for passengers, an outwardly extended wall supported at one side of said room enclosing wall forming a space adapted to receive and enclose the nose of an airship, and means for mooring the airship to said floor member.

3. In a mooring station for dirigible airships of the lighter-than-air type, a rigid building super-structure having a rigid floor, a rigid platform extending outwardly from and spaced below said floor, a room enclosing wall rotatively supported by said platform, an annular floor member supported by said wall around said floor and cooperating with said wall and said floor to form a room for passengers, an outwardly extended wall supported at one side of said room enclosing wall forming a space adapted to receive and enclose the nose of an airship, means for mooring the airship to said floor member, and means supported by said first named wall for utilizing wind and air currents to turn said first named wall and extend the airship to leeward therefrom.

4. In a station for dirigible airships of the lighter-than-air type, a rigid building of relatively considerable height having a rigid floor, a rigid platform below and extending outwardly beyond said floor, a mooring turret rotatively supported by said platform and including a wall surrounding said floor and having an opening, an annular floor member supported by said turret surrounding and in continuation of said first named floor, means for holding the nose of an airship of the lighter-than-air type in fixed relation to said turret at said opening, and means forming a plurality of vertical series of passages into and through the lower portion of said building for the entrance and exit of passengers.

5. In a station for dirigible airships of the lighter-than-air type, a rigid building of relatively considerable height having a rigid floor, a rigid platform below and extending outwardly beyond said floor, a mooring turret rotatively supported by said platform and including a wall surrounding said floor and having an opening, an annular floor member supported by said turret surrounding and in continuation of said first named floor, means for holding the nose of an airship of the lighter-than-air type in fixed relation to said turret at said opening, means forming a plurality of vertical series of passages into and through the lower portion of said building for the entrance and exit of passengers, and mechanism supported by said platform and said turret for rotating said turret to extend the airship to leeward therefrom.

6. In a station for dirigible airships of the lighter-than-air type, a rigid building of relatively considerable height having a rigid floor, a rigid platform below and extending outwardly beyond said floor, a mooring turret rotatively supported by said platform and including a wall surrounding said floor and having an opening, an annular floor member supported by said turret surrounding and in continuation of said first named floor, means for holding the nose of an airship of the lighter-than-air type in fixed relation to said turret at said opening, means forming a plurality of vertical series of passages into and through the lower portion of said building for the entrance and exit of passengers, and means for utilizing wind and air currents to turn the turret and extend the airship to leeward therefrom.

HENRI RUSCH.